United States Patent [19]
Sparks

[11] Patent Number: 5,984,241
[45] Date of Patent: Nov. 16, 1999

[54] BI-DIRECTIONAL, DUAL ACTING, ELECTRIC SAFETY LOCK

[75] Inventor: Gary A. Sparks, Crystal Lake, Ill.

[73] Assignee: MPC Products Corporation, Niles, Ill.

[21] Appl. No.: 08/924,963

[22] Filed: Sep. 8, 1997

[51] Int. Cl.[6] .............................. B64C 13/14; B64C 13/04
[52] U.S. Cl. .................. 244/224; 244/75 R; 244/110 B; 244/220; 244/221
[58] Field of Search ................................ 244/224, 110 B, 244/75 R

[56] References Cited

U.S. PATENT DOCUMENTS

| | | | |
|---|---|---|---|
| 3,599,510 | 8/1971 | Scott, Sr. et al. | 74/625 |
| 4,012,015 | 3/1977 | Nelson et al. | 244/83 F |
| 4,567,786 | 2/1986 | Sakurai | 74/483 R |
| 5,720,449 | 2/1998 | Laboure et al. | 244/110 B |

*Primary Examiner*—Charles T. Jordan
*Assistant Examiner*—Vagnola K. Comer
*Attorney, Agent, or Firm*—Laff, Whitesel & Saret, Ltd.

[57] ABSTRACT

An electrical lock for a moving part prevents the part from moving unless a device controlled by the part is in a safe mode. The invention may find a use in many different environments. The specific example here described is a set of reverse thruster doors on a jet engine. The lock prevents a throttle from applying or removing power unless the reverse thruster doors are properly set for such application or removal of power. The lock is removed when the doors reach full deployment or retraction, respectively, which is appropriate for the direction in which said throttle is moved. These functions are provided under the control of a single solenoid.

12 Claims, 3 Drawing Sheets

1

BI-DIRECTIONAL, DUAL ACTING, ELECTRIC SAFETY LOCK

FIELD

This invention relates to locks for automatically controlling the movement of a bi-directional mechanical part, and more particularly—but not exclusively—to bi-directional, electric safety lock devices for fail-safe operation in potentially dangerous conditions, such as on the throttle of a jet aircraft, for example.

BACKGROUND

The invention may find use in almost any place where it is necessary to lock a mechanical part in an immobile position until it is safe for that part to move. In particular, the invention is especially useful when size and weight are serious constraints. For example, every ounce that is added to an airplane demands seven or more additional ounces for support, fuel, engine power, etc. Therefore, the inventive safety lock should be as light and as small as it reasonably can be considering the task which it is designed to perform.

However, to give a concrete example of one place where the invention may find special utility, reference may be made to operation of the reverse thrusters on a jet aircraft and to the deployment and retraction of doors behind the jet engine for reverse thrust. For example, when the jet plane is coming in for a landing, many sensors detect things such as weight on the wheels on touch down, the rotational speed of the wheels, and the like. After touchdown, the pilot wants to initiate deployment of thrust reversing doors behind the engine and increase thrust in order to slow the airplane to assist braking on the runway. Also, in the event of a "touch and go" type go around (taking off again after touching down), he wants to be certain that the doors are fully retracted, before he goes to full throttle (forward thrust).

When the pilot moves the levers backward for power with reverse thrust, it is necessary to block movement of the levers until the reverse thrust doors are fully deployed. Otherwise, he might cause power to be applied at a point where the applied force could override the thrust reverse doors and inadvertently apply forward thrust at a critical stage when available runway is running out. Likewise, after the touch down and full deployment of the thrust reverse doors, the pilot might see something on the runway and move to full throttle in order to abort the landing and take off. The full throttle power cannot be allowed to take effect until the thrust reverse doors are stowed. Otherwise, instead of taking off inadvertent reverse thrust would be applied.

Of course, the invention is equally applicable to almost any similar situation where a mechanical part must be restrained from immediate operation, and yet be enabled for an immediate response as soon as it is safe or desirable to do so. One can easily imagine many other examples of situations where a part is locked until sensors of various sorts signal the ability of a mechanical part to move.

In each of these and similar situations, it is necessary to lock the moving part against motions in either of opposite directions of its possible excursion until such motion is safe or desirable. There are many sensors, that respond to such things as the deployment or retraction of the thrust reverse doors, which may be connected to remove the lock upon the movable part as soon as it is safe to do so. The invention should be able to work with most of these sensors.

SUMMARY

Accordingly, an objective of the invention is to provide a unique combination of fail safe mechanisms designed to fulfill a function within restricted design restraints, especially safety restraints. Here, a requirement is to provide a mechanism having an electromechanical latch which can be configured to operate in two independently triggered positions and to be sensitive to safety lock outs. It is desirable to accomplish these objectives with few moving parts. In this connection, it is prerequisite to accomplish this in conjunction with minimized size and weight.

In keeping with the aim of the invention, these and other objectives are provided by a mechanism comprising a solenoid actuated pivoting arm which locks a rotating cam in either of two positions. When the cam is rotated in one direction, a lock out is encountered when the solenoid is energized. Similarly, when the cam is rotated in a counter direction, it causes a lock out when the solenoid is de-energized. The release from either lock out condition is achieved by reversing the energized or de-energized state of the solenoid, as appropriate. Isolation between the two lock out conditions is achieved responsive to a position sensitive cam operated switch which changes over the energizing/de-energizing circuit depending upon the angular position of the cam.

BRIEF DESCRIPTION OF THE DRAWINGS

A preferred embodiment of the invention is shown in the attached drawing, in which.

DESCRIPTION

Figure 1:
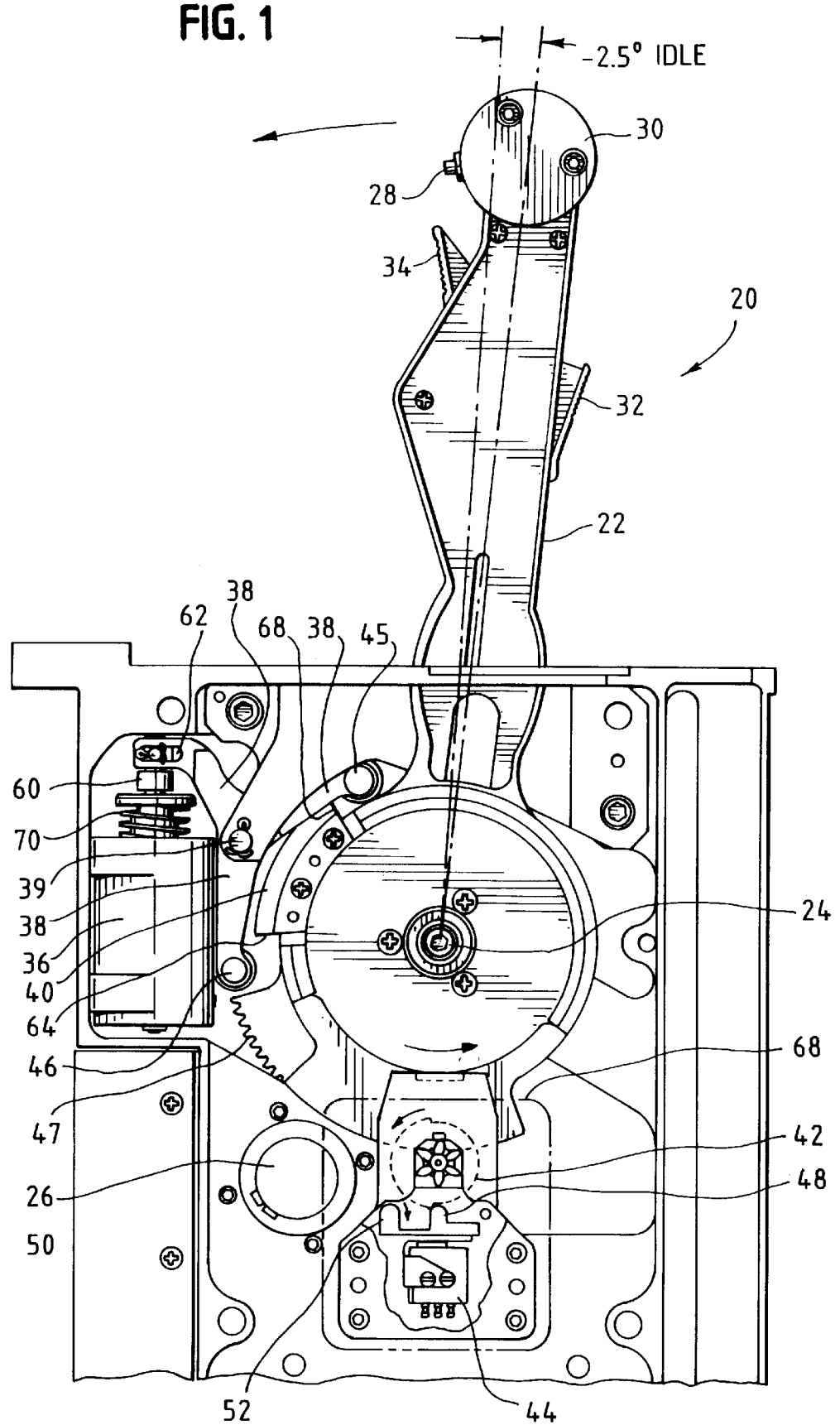
FIG. 1 is an elevation showing the inventive mechanism in a switching neutral position, and is provided primarily for a description of the various parts.

Purely by way of example, the invention is here described in connection with the throttle 20 of a jet aircraft having reverse thruster doors which are deployed to slow the aircraft. More particularly, the throttle has a lever arm 22 which may rotate forward or reverse about a pivot point 24 in order to apply or remove jet engine power. In normal flight, the engines are controlled by an auto throttle, which includes the control of a motor 26 that automatically drives the throttle lever arm 22 in a forward thrust regime dependent upon a sensed need for power. If the pilot wishes to temporarily override the automatic throttle feature, he presses a push button 28 while gripping knob 30 in order to move the throttle lever 22. If he wishes to permanently enable or inhibit the automatic throttle operation by motor 26, he operates a manual switch 32. A separate trigger lever releases the throttle lever into the reverse thrust range and thus initiating subsequent deployment or retraction of the reverse thruster doors, shown in FIGS. 4, 5. The parts (of FIG. 1) described thus far are conventionally found on a jet aircraft throttle assembly.

The invention adds a solenoid 36 which controls the enablement of the throttle. An example of a suitable solenoid is found in U.S. Pat. No. 5,836,001, filed Sep. 8, 1997, and granted Nov. 10, 1998, by Jerry D. Hielkema, Gary A. Sparks and David J. Treadwell and entitled "Solenoid Having Multistage Plunger".

Means are provided for inhibiting or enabling a movement of the throttle depending upon whether or not an unsafe condition exists at the time when an attempt is made to move the throttle. In greater detail, the solenoid controls a three prong lock out latch arm 38 which pivots about point 39 to engage a lock out cam 40. A control cam 42 and a micro switch 44 detects and discriminates between forward and reverse throttle movement. A pair of inhibiting means in the form of rollers 45 and 46, are mounted on the ends of two of the three prongs of lock out latch 38 to selectively engage a lock out face on lock out cam 40.

Figure 2:
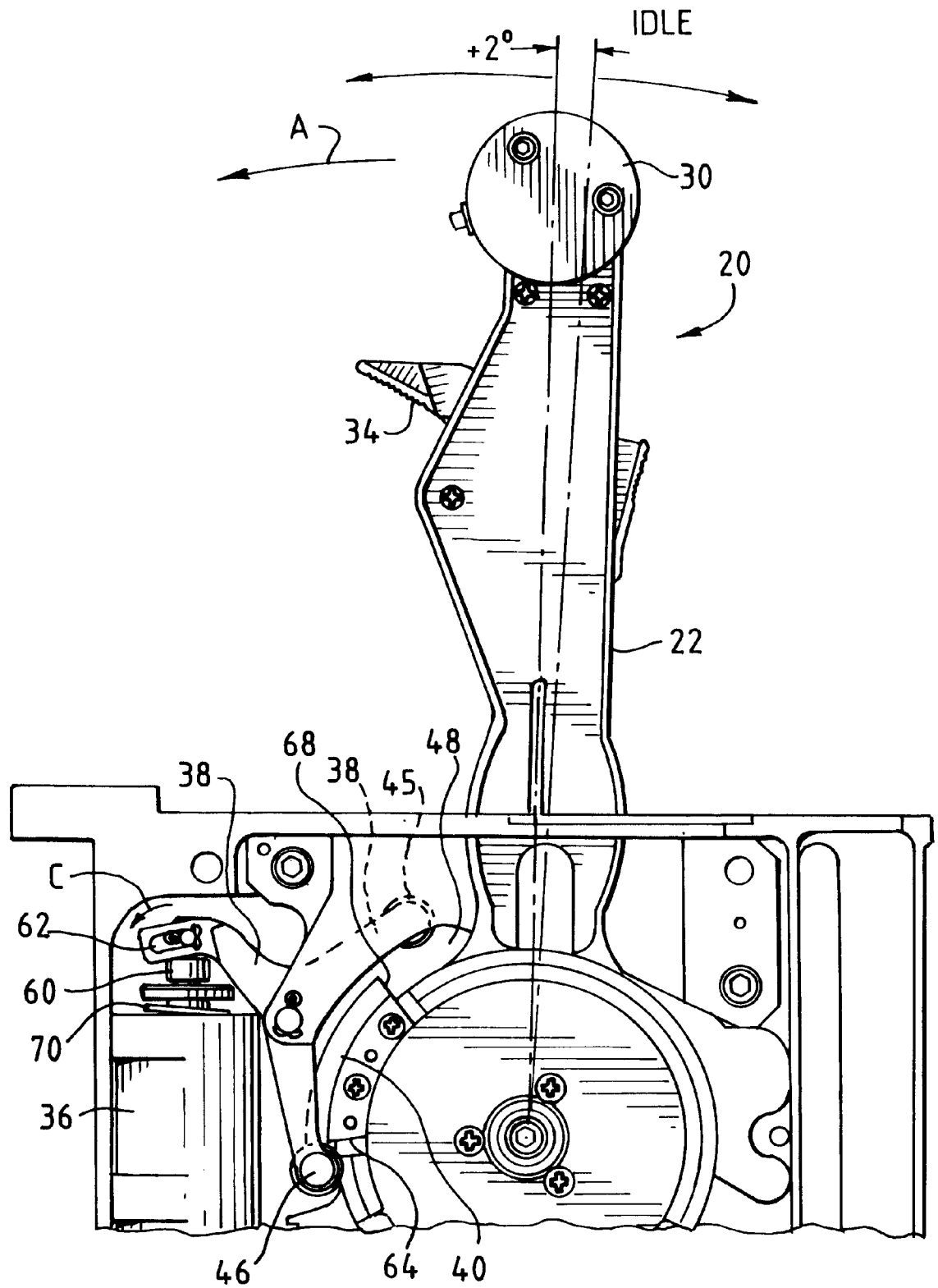
FIG. 2 is yet another showing of the invention in a forward lock out position.
Figure 3:
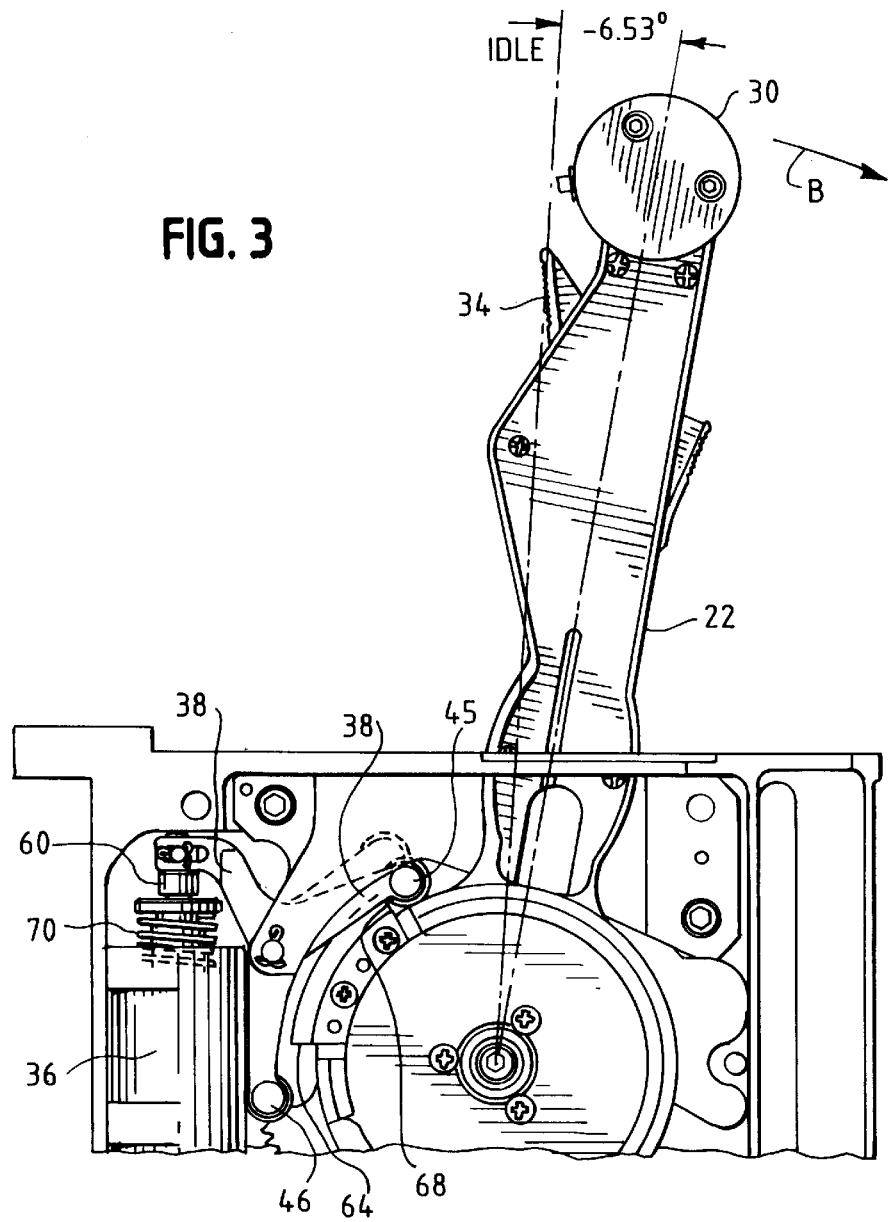
FIG. 3 is a similar elevation showing the invention in a reverse lock out position.

A single tooth drive gear 47 is mounted to rotate about point 24 in unison with the throttle lever arm 22. As gear 47 turns, pinion 48 rotates to turn a control cam 42 having a profile which indicates whether the throttle is moved in a forward direction (FIG. 2) or a reverse direction (FIG. 3). A micro switch activator 52 has a cam follower activator 54 which responds to the profile of the cam 42 in order to operate or release micro switch 44 which, in turn, is connected to energize or de-energize solenoid 36.

It should be noted that in the neutral position of FIG. 1, the plunger 60 of solenoid 36 is in the center of slot 62 on one prong of the three prong lock out latch arm 38. If the throttle 20 is pulled forward (Direction A—FIG. 2), pinion 48 (FIG. 1) turns cam 42 so that its profile 50 pushes cam follower activator 54 down (as viewed in FIG. 1). Micro switch 44 operates and closes its contacts which passes a 28v energizing signal to solenoid 36 if the aircraft thrust reversers are not fully stowed. As the solenoid 36 is operated (FIG. 2), plunger 60 is pulled into the solenoid coil which moves its connection towards the right hand end of slot 62 as it pulls the three prong lock out latch arm 38 in Direction C. The end of the prong which has a roller 46 is moved in direction D. As the throttle is rotated in direction A, the roller 46 is pressed against a stop or lock out face 64 on the lock out cam 40 in order to inhibit a movement of the throttle in Direction A.

If the throttle 20 is pushed back (FIG. 3), in Direction B, pinion 48 (FIG. 1) is rotated in an opposite direction to turn cam 42. The cam follower activator 54 moves up (as viewed in FIG. 1) to release the micro switch 44 which opens its contacts and, if thrust reversers are not fully deployed, then, in turn, de-energizes solenoid 36. When solenoid 36 releases (FIG. 3), spring 70 pushes the plunger 60 to an extended position. In this position, the throttle cannot be applied because the solenoid plunger 60 raises the three prong latch arm 38 which presses down roller 45 to capture the reverse lock out face 68 and inhibit the movement of the throttle in Direction B.

Hence, it is seen that, when the solenoid 36 is energized (FIG. 2), plunger 60 is retracted, three prong lock out latch arm 38 is pulled down, and roller 46 is lodged against the forward stop or lock out face 64 to prevent the throttle from being pulled forward (Direction A). When the solenoid 36 is de-energized (FIG. 3), the plunger 60 extends, the three prong latch arm 38 is pushed up by spring 70, and roller 45 is lodged against reverse lock out face 68 to prevent the throttle from being pushed back (Direction B).

Figure 4:
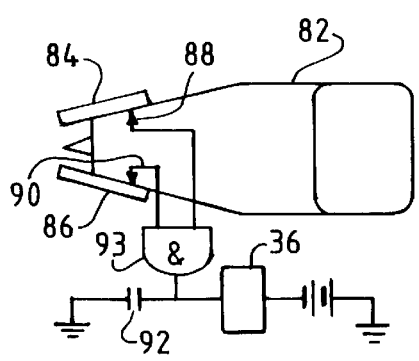
FIG. 4 schematically shows a jet engine with its reverse thruster doors fully retracted.
Figure 5:
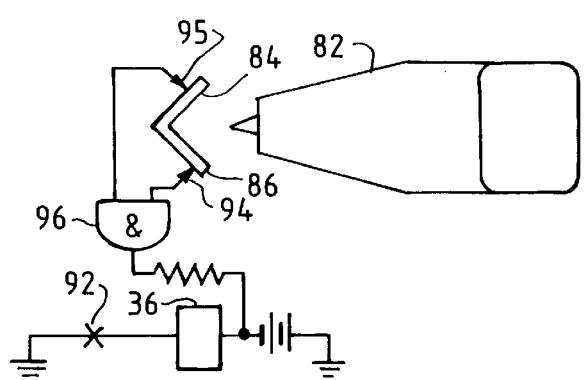
FIG. 5 shows the jet engine with its reverse thruster doors fully deployed.

As pointed out above, the inventive mechanism may be used in any of many installations where this type of action is required. However, the specific example of reverse thruster doors on a jet engine has been cited to show one use. In greater detail, FIG. 4 schematically shows a jet engine 82 with the reverse thruster doors 84, 86 retracted, to close sensor contacts symbolically shown at 88, 90. Before these sensor contacts close, micro switch 44 (FIG. 1) contacts 92 are open and the solenoid 36 is de-energized to inhibit the jet engine from responding to the reverse thrust throttle command. After both reverse thruster doors are fully deployed, the two sensor contacts 88, 90 complete an AND circuit 93 to energize the solenoid, which releases the lock out of FIG. 3 to enable the jet engine to respond to the reverse thrust command. Likewise, FIG. 5 schematically shows jet engine 82 with its reverse thruster doors 84, 86 fully deployed to close sensor contacts symbolically shown at 90, 94. Before these sensor contacts are closed, the micro switch contacts 92 are closed to energize the solenoid 36 and inhibit a full throttle response. These sensors indicate whether the reverse thruster doors are retracted or extended, but they could be other sensors on any other parts which require the kind of lock out that has been described.

In operation, on landing (FIG. 2), lever 34 is manually extended to permit throttle movement into reverse thrust range. Reverse thrust power is applied against the reverse thruster doors to slow the forward roll of the airplane.

On take off (FIG. 3), there would be a problem since, if the reverse thruster doors are deployed, a forward operation of the throttle would produce catastrophic results. Hence, the solenoid 36 is de-energized and roller 45 blocks the reverse lock out face 68. When the reverse thruster doors are fully retracted, a sensor energizes the solenoid 36 to lift roller 45 away from the reverse lock out face 68. Then, the throttle lever arm 22 can be moved in Direction B.

Those who are skilled in the art will readily perceive how to modify the invention. Therefore, the appended claims are to be construed to cover all equivalent structures which fall within the true scope and spirit of the invention.

The invention claimed is:

1. A bi-directional electric safety lock for a manually operated control lever comprising a mechanical part mounted on said control lever, said part being moved in either of two directions responsive to movement of said control lever, a solenoid, first locking means responsive to energizing said solenoid for precluding a movement of said part in one of said two directions, second locking means responsive to de-energizing said solenoid for precluding a movement of said part of the other of said two directions, sensor means for detecting a physical condition of a device controlled by said control lever, and means for de-energizing or energizing said solenoid to remove said first or second locking means, respectively, depending on when said sensor means indicates that the device is ready to be controlled by said mechanical part.

2. The safety lock of claim 1 wherein said mechanical part includes a lock out cam which moves in unison and synchronism with said part, said lock out cam having a lock out face associated with each of said two directions, and means responsive to said solenoid in an energized condition for engaging one of said lock out faces, and means responsive to said solenoid in said de-energized condition for energizing the other of said lock out faces.

3. The safety lock of claim 2 and a micro switch controlled by a second cam coupled to move in synchronism with said mechanical part, said second cam having a profile which identifies the one of said two directions in which said part moves, and means responsive to a position of said second cam for energizing or de-energizing said solenoid.

4. The safety lock of claim 2 and a three prong lock out arm pivoted to swing about a point, one of said prongs being coupled to said solenoid whereby said lock out arm swings back and forth over an arcuate excursion extending in two directions in response to the energization or de-energization state of said solenoid, a second of said prongs having inhibiting means thereon for engaging one of said lock out faces when said lock out arm swings in one of said two directions, and a third of said prongs having inhibiting means thereon for engaging the other of said lock out faces when said lock out arm swings in a second of said two directions, said three prong lock out arm having dimensions which precludes the two inhibiting means from simultaneously engaging said lock out faces, and means responsive to either said energization or de-energization of said solenoid for precluding movement of said part in a corresponding one of said two directions.

5. The safety lock of any one of the claims 1–4 wherein said mechanical part includes an aircraft throttle, said device comprises reverse thruster doors on a jet engine, and said sensor means are associated with said reverse thruster doors and are coupled to signal when said doors are either fully deployed or are fully retracted.

6. A bi-directional, dual acting, electric safety lock comprising an aircraft throttle having a lever mounted to pivot in either of two directions about a point, a gear which turns about said point in unison with movement of said lever as it pivots about said point, a pinion driven by said gear to indicate in which of said two directions said lever moves, a cam having two lock out faces also mounted to turn about said point in unison with said gear and said lever, a lock out arm mounted for limited rotation movement, a solenoid coupled to be energized or de-energized responsive to said direction of said lever movement as indicated by said pinion, said solenoid being coupled to move said lock out arm back and forth over said limited rotational movement depending upon whether said solenoid is energized or de-energized, and lock out means responsive to said rotational movement of said lock out arm for applying a first restraining force upon one of said lock out faces associated with one of said rotational movements and for applying a second restraining force upon the other of said lock out faces associated with an opposite one of said rotational movements, said lock out means for precluding a simultaneous application of both said first and second restraining forces.

7. The safety lock of claim 6 and means for sensing a condition of a device controlled by said lever, and control means responsive to said sensed condition for reversing said energized or de-energized state of said solenoid, thereby removing said restraining means.

8. The safety lock of claim 7 wherein said aircraft is a jet aircraft and said device is a set of reverse thruster doors on said jet aircraft, sensor means for sensing whether said thruster doors are deployed or retracted, and said control means being operated by said sensor means.

9. The safety lock of claim 6 wherein said pinion has an associated cam; said associated cam having a profile which provides said indication of the one of said two directions in which the lever moves, and a switch selectively operated by the profile on said associated cam for selecting between said energization and said de-energization states of said solenoid.

10. An electrical lock for inhibiting or enabling a movement of a mechanical part depending upon when said part may be safely moved under prevailing conditions, said lock comprising bi-directional means for commanding said movement of said mechanical part, there being a possible unsafe condition during a period which begins when said bi-directional means issues said command, inhibit means responsive to an actual existence of said possible unsafe conditions for inhibiting said commanded movement of said mechanical part, enabling means responsive to a termination of said actual unsafe condition for removing said inhibition of said commanded movement, thereby enabling said movement, wherein said bi-directional means is lever which may be moved about a pivot point in only a forward or reverse direction, an inhibition part which can be moved in one direction or an opposite direction to prevent said level from moving or to enable said lever to move in a corresponding one of said forward or reverse directions, means comprising a single solenoid for moving said inhibition part in a first direction when said solenoid is energized and in a second direction when said solenoid is de-energized, detector means for detecting in which of said two directions said lever is moved, said solenoid being energized responsive to said detector means, and means responsive to a termination of said unsafe condition for reversing the energized/de-energized state of said solenoid.

11. The lock of claim 10 wherein said lever has two lock out faces associated therewith, one of said lock out faces inhibiting said forward lever movement, the other of said lock out faces inhibiting said reverse lever movement, and said inhibit means comprises means for engaging a selected one of said lock out faces, and said enabling means comprising means for removing said engagement with said lock out face.

12. The lock of claim 10 and sensor means for sensing when a possible unsafe condition does or does not exist, and means responsive to said sensor means for reversing said energized or de-energized condition of said solenoid when an inhibit condition exists.

\* \* \* \* \*